Patented Aug. 19, 1924.

1,505,912

UNITED STATES PATENT OFFICE.

PAUL NAWIASKY, OF LUDWIGSHAFEN-ON-THE-RHINE, GERMANY, ASSIGNOR TO BADISCHE ANILIN- & SODA-FABRIK, OF LUDWIGSHAFEN-ON-THE-RHINE, GERMANY, A CORPORATION OF GERMANY.

VAT DYESTUFFS.

No Drawing.    Application filed January 30, 1923.   Serial No. 615,922.

*To all whom it may concern:*

Be it known that I, PAUL NAWIASKY, a citizen of Austria, residing at Ludwigshafen-on-the-Rhine, Germany, have invented new and useful Improvements in Vat Dyestuffs, of which the following is a specification.

As is known dibenzanthrone can be converted into derivatives, richer in bound oxygen, by the action of oxidizing agents with or without a subsequent reduction (see Patent 1,093,427). These products by a subsequent condensation are transformed, according to Patent 1,207,762, into condensation products having the character of green vat dyestuffs.

I have now further discovered that dyestuffs of still far more valuable properties which especially are distinguished by producing a brilliant green shade of an extraordinary fastness can be obtained by methylating as well as halogenating the said products. The production of the new methyl halogen derivatives can be effected in several ways. They may be produced by first methylating either the oxidized dibenzanthrone derivatives, whether reduced or not, described in the specification 1,093,427, or the condensation products thereof, described in the Patent 1,207,762, by heating them with a methyl ester of toluene sulfonic acid or other methylating agents, and then introducing halogen into the methyl derivatives obtained, or they can be prepared by first halogenating the condensation products described in the said Patent 1,207,762, as is set forth in the Patent 1,201,968 for the treatment with bromine, and subsequently methylating these halogen derivatives. In either case new coloring matters are produced which are distinguished from the products of the aforesaid Patents 1,207,762 and 1,201,968 by a far more brilliant green shade and from the methylated but non-halogenated derivative of the dyestuffs described in the Patent 1,207,762 by a more yellowish green color.

The new products have the property of dissolving in fuming sulfuric acid of about 23 per cent with a color remaining brown eventually whilst the alkylated non-halogenated dyestuff dissolves with a bottle-green or olive green color. They also are distinguished from the methylated but non-halogenated dyestuff in being partly decomposed when crystallized from organic solvents of a high boiling point, for example trichlorbenzene, halogen derivatives of the non-methylated dyestuff which dye not fast to soaping being produced; the methylated, non-halogenated product can be recrystallized without alteration. The dyeing produced with the new coloring matters do not bleed on undyed cotton yarn when boiled together with the latter in soap solution and excel by prominent fastness to most attacks.

The following examples will serve to illustrate the nature of this invention which however is not limited thereto. The parts are by weight.

Example 1.

5 parts of oxidized dibenzanthrone as obtained according to Example 3 of the Patent 1,093,427 are boiled for 3 hours under a reflux cooler with 150 parts of trichlorbenzene, 5 parts of calcined sodium carbonate and 5 parts of methyl-para-toluene-sulfonate. When cool, the liquid is filtered off, the residue freed from salts and trichlorbenzene in the usual way, and dried. Dimethyl-sulfate can also be employed. 2 parts of the methylated dyestuff thus obtained are dissolved in 30 parts of monohydratic sulfuric acid, 1.3 parts of bromine are then added and the mixture is allowed to stand for 16 hours without heating but while stirring occasionally. The solution is then poured into water and the dyestuff which is thereby precipitated is filtered off and worked up in the usual way. It dyes cotton from the vat brilliant green shades that are more yellowish than the dyeing of the non-halogenated dyestuff. The halogenated dyestuff differs from the non-halogenated methylated dyestuff in the color of the solution in fuming sulfuric acid of about 23 per cent $SO_3$ which after some time remains brown in the case of the halogenated product and olive-green in the case of the non-halogenated dyestuff.

Example 2.

3 parts of the dyestuff obtained by methylating oxidized dibenzanthrone, as mentioned in the foregoing Example 1, are suspended in 90 parts of nitrobenzene, and 3 parts of sulfuryl chlorid are added. The mixture is then stirred for 3 hours at a temperature of 80 degrees to 90 degrees centigrade, allowed to cool and filtered off. The precipitated dyestuff is transformed in the usual manner into an aqueous paste and dyes cotton a similar shade as the dyestuff obtained according to the aforesaid Example 1. The new dyestuff dissolves in fuming sulfuric acid of 23 per cent with a brown color.

*Example 3.*

The dyestuff obtained by methylating oxidized dibenzanthrone as mentioned in Example 1, is dried and finally powdered, whereupon chlorine is passed over while shaking the powder repeatedly. The excess of chlorine is then removed by treating with bisulfite. The new dyestuff dyes similar shades as the dyestuff obtained according to Example 1. It dissolves in fuming sulfuric acid of 23 per cent with a brown color.

*Example 4.*

150 parts of nitrobenzene are mixed with 3 parts of the brominated dyestuff described in Example 1 of the Patent 1,201,968, 3 parts of soda ash and 3 parts of methyl-para-toluene-sulfonate and boiled for 3 hours whereupon 3 more parts each of soda ash and of methyl-toluene-sulfonate are added, boiled for another 3 hours and the addition of the said agents and boiling is repeated alternatively until a test portion of the dyestuff produces green dyeings on cotton which when spotted with a mineral acid no longer turn blue. When ready, the dyestuff which at ordinary temperature is practically insoluble in the mixture, is worked up in the usual way. It contains bromine and dyes cotton from the vat brilliant green shades. In fuming sulfuric acid of 23 per cent $SO_3$ it dissolves with a reddish brown color.

The products obtained according to the process described in this specification will produce especially pure and bright shades when the initial materials, or intermediate compounds, are subjected to a suitable treatment to effect a purification. In particular when the methylated product mentioned in Examples 1, 2 or 3 is recrystallized or extracted by means of organic solvents, for example nitrobenzene or trichlorbenzene or when it is partially precipitated from a solution in concentrated sulfuric acid by cautiously adding dilute sulfuric acide, on halogenating such a purified product, green vat dyestuffs of a very bright yellowish green shade are obtained.

What I claim is:—

1. As a new article of manufacture vat coloring matters of the dibenzanthrone series which dyestuffs are derived from oxidized dibenzanthrone and contain halogen as well as methoxyl groups and which produce on cotton from the hydrosulfite vat brilliant green dyeings with a yellowish hue which do not bleed on undyed cotton when boiled together with it in soap solution and which dyestuffs dissolve in fuming sulfuric acid producing a solution remaining brown.

2. As a new article of manufacture a vat coloring matter of the dibenzanthrone series which dyestuff is derived from oxidized dibenzanthrone and contains bromine and methoxyl groups and which produces on cotton from the hydrosulfite vat brilliant green dyeings with a yellowish hue which do not bleed on undyed cotton when boiled together with it in soap solution and which dyestuffs dissolve in fuming sulfuric acid producing a solution remaining brown.

3. The process of manufacturing new green vat dyestuffs of the dibenzanthrone series which consists in methylating and halogenating in whatever succession an oxidation product of dibenzanthrone.

4. The process of manufacturing new green vat dyestuffs of the dibenzanthrone series which consists in first methylating and then halogenating an oxidation product of dibenzanthrone.

5. The process of manufacturing a new green vat dyestuff of the dibenzanthrone series which consists in treating a reduced oxidation product of dibenzanthrone with a methylating agent, purifying the methylated product and introducing bromine in its molecule.

In testimony whereof I have hereunto set my hand.

PAUL NAWIASKY